(12) United States Patent
Lee

(10) Patent No.: US 10,141,636 B2
(45) Date of Patent: Nov. 27, 2018

(54) VOLUMETRIC SCAN AUTOMOTIVE RADAR WITH END-FIRE ANTENNA ON PARTIALLY LAMINATED MULTI-LAYER PCB

(71) Applicant: Toyota Motor Engineering & Manufacturing North America, Inc., Erlanger, KY (US)

(72) Inventor: Jae Seung Lee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 295 days.

(21) Appl. No.: 15/279,291

(22) Filed: Sep. 28, 2016

(65) Prior Publication Data

US 2018/0090827 A1 Mar. 29, 2018

(51) Int. Cl.
| | |
|---|---|
| *H01Q 1/32* | (2006.01) |
| *G01S 7/03* | (2006.01) |
| *G01S 13/93* | (2006.01) |
| *H01Q 21/06* | (2006.01) |
| *G01S 13/00* | (2006.01) |

(52) U.S. Cl.
CPC ............. *H01Q 1/3233* (2013.01); *G01S 7/03* (2013.01); *G01S 13/931* (2013.01); *H01Q 1/3283* (2013.01); *H01Q 21/067* (2013.01)

(58) Field of Classification Search
None
See application file for complete search history.

(56) References Cited

U.S. PATENT DOCUMENTS

| | | | |
|---|---|---|---|
| 4,298,873 A | 11/1981 | Roberts | |
| 4,414,550 A | 11/1983 | Tresselt | |
| 5,023,623 A | 6/1991 | Kreinheder et al. | |
| 5,023,624 A | 6/1991 | Heckaman et al. | |
| 5,227,808 A | 7/1993 | Davis | |
| 5,400,042 A | 3/1995 | Tulintseff | |
| 5,486,832 A | 1/1996 | Hulderman | |
| 5,557,291 A | 9/1996 | Chu et al. | |
| 5,767,793 A | 6/1998 | Agravante et al. | |

(Continued)

FOREIGN PATENT DOCUMENTS

| | | |
|---|---|---|
| CN | 104122556 | 10/2014 |
| DE | 102013100554 | 1/2013 |

(Continued)

OTHER PUBLICATIONS

Ye et al.; "A Dual-Band Printed End-Fire antenna with DSPSL Feeding" 6 pages; Dec. 17, 2015.

(Continued)

*Primary Examiner* — Bernarr E Gregory
(74) *Attorney, Agent, or Firm* — Snell & Wilmer LLP

(57) ABSTRACT

A vehicular radar system includes a first printed circuit board (PCB) having a first material. The vehicular radar system also includes a plurality of end-fire antennas positioned on the first PCB. The vehicular radar system also includes a second PCB stacked on or under the first PCB and having a second material that has a greater rigidity than the first material. The vehicular radar system also includes a radio frequency integrated circuit (RFIC) coupled to the plurality of end-fire antennas and configured to control the plurality of end-fire antennas.

20 Claims, 7 Drawing Sheets

(56) References Cited

U.S. PATENT DOCUMENTS

| | | | |
|---|---|---|---|
| 5,872,542 A | 2/1999 | Simons et al. | |
| 5,874,915 A | 2/1999 | Lee et al. | |
| 5,940,011 A | 8/1999 | Agravante et al. | |
| 6,046,703 A | 4/2000 | Wang et al. | |
| 6,061,035 A | 5/2000 | Kinasewitz et al. | |
| 6,154,176 A | 11/2000 | Fathy et al. | |
| 6,317,094 B1 | 11/2001 | Wu et al. | |
| 6,366,254 B1 | 4/2002 | Sievenpiper et al. | |
| 6,496,151 B1 | 12/2002 | Ferreri et al. | |
| 6,496,155 B1 | 12/2002 | Sievenpiper et al. | |
| 6,549,170 B1 | 4/2003 | Kuo et al. | |
| 6,624,845 B2 | 9/2003 | Loyd et al. | |
| 6,815,739 B2 | 11/2004 | Huff et al. | |
| 6,950,062 B1 | 9/2005 | Mather et al. | |
| 7,109,938 B2 | 9/2006 | Franson et al. | |
| 7,170,446 B1 | 1/2007 | West et al. | |
| 7,268,732 B2 | 9/2007 | Gotzig et al. | |
| 7,411,542 B2 | 8/2008 | O'Boyle | |
| 7,532,170 B1 | 5/2009 | Lee et al. | |
| 7,728,772 B2 | 6/2010 | Mortazawi et al. | |
| 7,742,004 B2 | 6/2010 | Fukushima et al. | |
| 7,821,355 B2 | 10/2010 | Engel et al. | |
| 7,924,226 B2 | 4/2011 | Soler Castany et al. | |
| 8,175,512 B2 | 5/2012 | Cornwell | |
| 8,259,032 B1 | 9/2012 | Buckley | |
| 8,319,678 B2 | 11/2012 | Weiss | |
| 8,405,468 B2 | 3/2013 | Uchaykin | |
| 8,576,111 B2 | 11/2013 | Smith et al. | |
| 8,604,991 B2 | 12/2013 | Nagayama | |
| 8,836,592 B2 | 9/2014 | Paulus et al. | |
| 8,902,117 B2 | 12/2014 | Ohno et al. | |
| 8,912,968 B2 | 12/2014 | Sharma et al. | |
| 8,922,448 B2 | 12/2014 | Wong et al. | |
| 8,952,678 B2 | 2/2015 | Giboney et al. | |
| 9,013,365 B2 | 4/2015 | Lee et al. | |
| 9,065,163 B1 | 6/2015 | Wu et al. | |
| 9,142,889 B2 | 9/2015 | Pazin et al. | |
| 9,214,739 B2 | 12/2015 | Sover et al. | |
| 9,225,058 B2 | 12/2015 | DeVries et al. | |
| 9,337,542 B2 | 5/2016 | Coburn et al. | |
| 9,397,740 B2 | 7/2016 | Maltsev et al. | |
| 2005/0225481 A1* | 10/2005 | Bonthron | G01S 7/032 342/175 |
| 2006/0044189 A1 | 3/2006 | Livingston et al. | |
| 2006/0097906 A1* | 5/2006 | Heide | G01S 7/032 342/22 |
| 2006/0152406 A1* | 7/2006 | Leblanc | G01S 7/032 342/175 |
| 2007/0013581 A1* | 1/2007 | Iijima | G01S 7/032 342/175 |
| 2008/0303147 A1* | 12/2008 | Watanabe | H01L 23/522 257/737 |
| 2009/0251357 A1* | 10/2009 | Margomenos | G01S 13/931 342/70 |
| 2012/0194377 A1* | 8/2012 | Yukumatsu | G01S 13/931 342/70 |
| 2012/0235881 A1 | 9/2012 | Pan et al. | |
| 2012/0295015 A1 | 11/2012 | Yang | |
| 2013/0076579 A1 | 3/2013 | Zhang et al. | |
| 2013/0201076 A1 | 8/2013 | Vos et al. | |
| 2014/0070994 A1 | 3/2014 | Schmalenberg et al. | |
| 2014/0266902 A1 | 9/2014 | Kamgaing et al. | |
| 2015/0070228 A1 | 3/2015 | Gu et al. | |
| 2015/0130673 A1 | 5/2015 | Ng et al. | |
| 2015/0268336 A1 | 9/2015 | Yukumatsu et al. | |
| 2015/0364445 A1* | 12/2015 | Choi | H01L 25/0652 257/664 |
| 2016/0033638 A1 | 2/2016 | Silc | |
| 2016/0125713 A1 | 5/2016 | Blech et al. | |

FOREIGN PATENT DOCUMENTS

| | | |
|---|---|---|
| WO | WO 01/52352 | 7/2001 |
| WO | WO 2009092695 | 7/2009 |
| WO | WO 2012076994 | 6/2012 |
| WO | WO 2014184554 | 11/2014 |

OTHER PUBLICATIONS

Amadjikpè "Integrated 60-GHz Antenna on Multilayer Organic Package with Broadside and End-Fire Radiation" *IEEE Transactions on Microwave Theory and Techniques*, vol. 61, No. 1, pp. 303-315; Jan. 2013.

Beer et al.; "Novel Antenna Concept for Compact Millimeter-Wave Automotive Radar Sensors;" *IEEE Antennas and Wireless Propagation Letters*; vol. 8; pp. 771-774; Jul. 7, 2009.

Bisognin et al.; "3D Printed Plastic 60 GHz Lens: Enabling Innovative Millimeter Wave antenna Solution and System;" *2014 IEEE MTT-S International Microwave Symposium (IMS2014)*; 4 pages; Jun. 1, 2014.

Choukiker et al.; "Hybrid Fractal Shape Planar Monopole Antenna Covering Multiband Wireless Communication with MIMO Implementation for Handheld Mobile Devices;" *IEEE Transactions on Antennas and Propagation*; vol. 62; No. 3; pp. 1483-1488; Dec. 17, 2013.

Dhiman et al.; "Effect of DGS Technique in MIMO Antenna;" *International Journal of Current Engineering and Technology*; vol.; No. 5; pp. 3138-3141; Oct. 2015.

Ranade, et al.; "Design of a Substrate Integrated Waveguide H Plane Horn Antenna on a PTFE Substrate for Automotive Radar Application" *Applied Electromagneties Conference (AEMC), 2011 IEEE*; 4 pages; Dec. 18, 2011.

Jansen et al.; "Antenne Design for 24 GHz and 60 GHz Emerging Microwave Applications;" *Koninklijke Philips Electronics N. V. 2006*; 137 pages; Jul. 2006.

Li et al.; "A Compact Wideband MIMO Antenna with Two Novel Bent Slits;" *IEEE Transactions on Antennas and Propagation*; vol. 60; No. 2; pp. 482-489; Feb. 2012.

Li, Yuan; "Development of Micromachined Millimeter Wave Modules for Wireless Communication Systems;" Georgia Institute of Technology; 128 pages; Aug. 2010.

Yang; "Dual Band-Notched Ultrawideband MIMO Antenna Array;" *Wireless Symposium (IWS), 2013 IEEE International*; 4 pages; Apr. 18, 2013.

Yuan et al. "Multiband Printed and Double-Sided Dipole Antenna for Wlan/WiMax Applications" Microwave and Optical Technology Letters, vol. 42, No. 4, pp. 1019-1022, Apr. 2012.

Schoenlinner, Bernhard "Compact Wide Scan-Angle Antennas for Automotive Applications and RF MEMS Switchable Frequency-Selective Surfaces" 2014.

Schwering, Felix K.; "Millimeter Wave Antennas;" *Proceedings of the IEEE*; vol. 80; No. 1; pp. 92-102; Jan. 1992.

Shamsinejad et al.; "Microstrip-Fed 3-D Folded Slot Antenna on Cubic Structure;" *IEEE Antennas and Wireless Propagation Letters*; vol. 15; pp. 1081-1084; 2016.

Tahim et al.; "Multi-Band Antenna Technology;" *Antennas and Propagation Society International Symposium*, 2004. IEEE; vol. 4, pp. 3968-3971; Jun. 20, 2004.

Litzenberger et al.; "Study of Waveguide Antenna Implemented in Laminated Material" Dec. 2002.

Djerafi et al.; "Innovative Multilayered Millimetre-Wave Antennas for Multi-Dimensional Scanning and Very Small Footprint Applications" Mar. 26, 2012.

Harvey et al. "Spatial Power Combining for High-Power Transmitters" *IEEE Microwave*; pp. 48-59; Dec. 2000.

Larumbe-Gonzalo et al. "Coherently Fed Frequency Scanning Phased Array Structure for Imaging Applications" IEEE 6th European Conference on Antennas and Propagation (EUCAP); pp. 2802-2806; 2011.

Li et al. "Dual-Beam Steering Microstrip Leaky Wave Antenna with Fixed Operating Frequency" *IEEE Transactions on Antennas and Propagation*; vol. 56, No. 1; pp. 248-252; Jan. 2008.

(56) References Cited

OTHER PUBLICATIONS

Ramadurgakar, Ameya "X Band Substrate Integrated Horn Array Antenna for Future Advanced Collison Avoidance System" Drexel University; 133 pages; 2011.

* cited by examiner

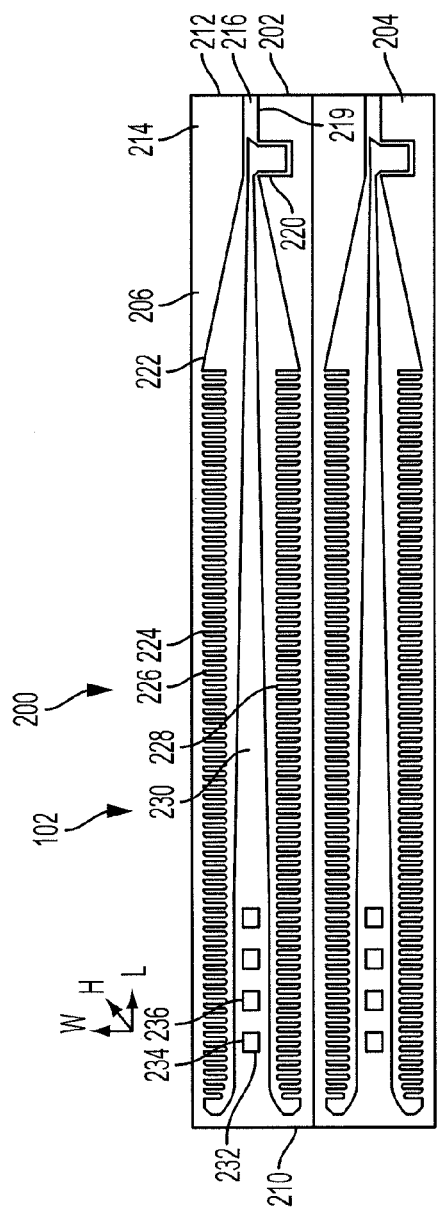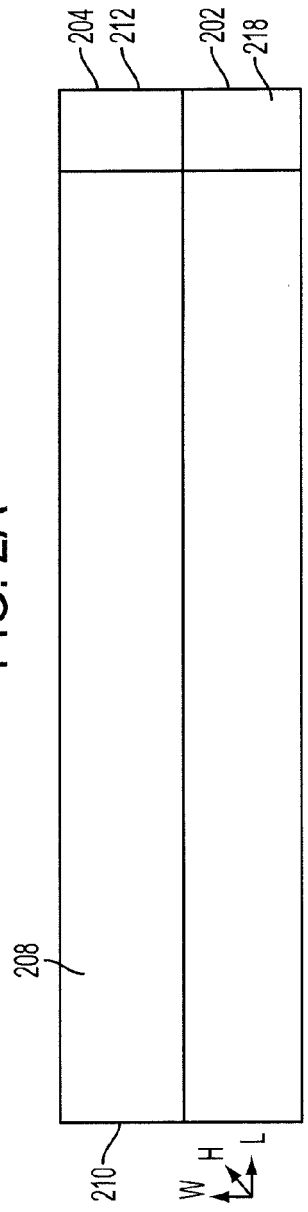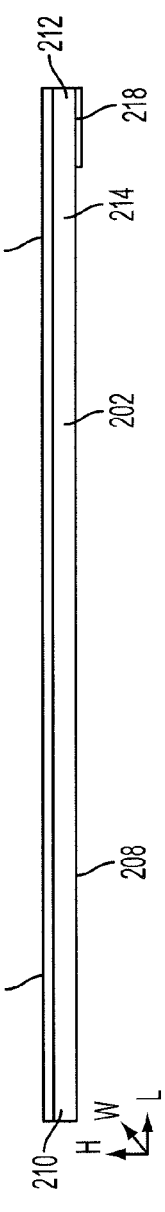
FIG. 2A
FIG. 2B
FIG. 2C

VOLUMETRIC SCAN AUTOMOTIVE RADAR WITH END-FIRE ANTENNA ON PARTIALLY LAMINATED MULTI-LAYER PCB

BACKGROUND

1. Field

The present disclosure relates to vehicular radar systems and, in particular, to a vehicular radar system having high-frequency printed circuit boards with antennas and low-frequency printed circuit boards stacked between the high-frequency printed circuit boards for structurally supporting the high frequency printed circuit boards.

2. Description of the Related Art

Autonomous and semi-autonomous vehicle functions are increasing in use. For example, some vehicle manufacturers are currently designing fully autonomous and semi-autonomous vehicles that can drive themselves from a starting location to a destination location. Some other vehicles include collision avoidance features that may warn a driver and/or control operations of a vehicle when detected data indicates that the vehicle may collide with another object. Algorithms for these autonomous and semi-autonomous vehicle features are based on detection of objects in the vicinity of the vehicle, such as street signs, other vehicles, people, and the like.

Many vehicles incorporate radar systems to detect such objects. Vehicular radar systems transmit a radar signal having a frequency of about 80 gigahertz (GHz) through the air. The radar signal is reflected from a target and the reflected signals or waves are then received by the vehicular radar system. The characteristics of the reflected signals are analyzed by a processor or a controller to determine characteristics of the objects that reflected the signal, such as a size of the object, a distance between the object and the vehicle, or the like.

Vehicular radar systems include antennas that transmit the radar signals. Typically, the antennas include metal traces on a printed circuit board (PCB). In order to reduce interference with the high-frequency radar signals, it is desirable for the PCB to be made from certain materials and to be relatively thin. The relative thinness and the materials used for such a PCB result in the PCB being relatively flexible or malleable.

Thus, there is a need for systems and methods for increasing the rigidity of end-fire antennas used in vehicular radar systems.

SUMMARY

Described herein is a vehicular radar system. The vehicular radar system includes a first printed circuit board (PCB) having a first material. The vehicular radar system also includes a plurality of end-fire antennas positioned on the first PCB. The vehicular radar system also includes a second PCB stacked on or under the first PCB and having a second material that has a greater rigidity than the first material. The vehicular radar system also includes a radio frequency integrated circuit (RFIC) coupled to the plurality of end-fire antennas and designed to control the plurality of end-fire antennas.

Also described is a vehicular radar system. The vehicular radar system includes a first radar board having a first printed circuit board (PCB) made of a first material and having a chip connection end and a transmission end and a first plurality of end-fire antennas. The vehicular radar system also includes a second radar board having a second PCB made of the first material and having a chip connection end and a transmission end and a second plurality of end-fire antennas. The vehicular radar system also includes a third PCB stacked between the first PCB and the second PCB and made of a second material that has a greater rigidity than the first material. The vehicular radar system also includes at least one radio frequency integrated circuit (RFIC) coupled to the first plurality of end-fire antennas and the second plurality of end-fire antennas and designed to control each of the first plurality of end-fire antennas and each of the second plurality of end-fire antennas.

Also described is a vehicular radar system. The vehicular radar system includes a first printed circuit board (PCB) having a chip connection end, a transmission end, a top, and a bottom. The vehicular radar system also includes a plurality of end-fire antennas positioned on the first PCB. Each of the plurality of end-fire antennas includes a ground structure positioned adjacent to the chip connection end of the first PCB on the bottom of the first PCB. Each of the plurality of end-fire antennas also includes a chip connection lead positioned adjacent to the chip connection end of the first PCB and electrically coupled to the RFIC. Each of the plurality of end-fire antennas also includes a balun positioned adjacent to the chip connection lead and configured to convert an unbalanced signal to a balanced signal or to convert a balanced signal to an unbalanced signal. Each of the plurality of end-fire antennas also includes a wave section having a first wave section and a second wave section separated by a space and configured to transmit a wireless radar signal. Each of the plurality of end-fire antennas also includes a tapered section positioned between the balun and the wave section and tapered towards the balun from the wave section. The vehicular radar system also includes a second PCB coupled to the top or the bottom of the first PCB, having a greater rigidity than the first PCB, and positioned between the balun of each of the plurality of end-fire antennas and the chip connection end of the first PCB. The vehicular radar system also includes a radio frequency integrated circuit (RFIC) coupled to the plurality of end-fire antennas and designed to control the plurality of end-fire antennas.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 2A is a drawing showing a top view of two end-fire antennas of an end-fire antenna array according to an embodiment of the present invention;

FIG. 2B is a drawing showing a bottom view of the end-fire antenna array of FIG. 2A according to an embodiment of the present invention;

FIG. 2C is a drawing showing a side view of the end-fire antenna array of FIG. 2A according to an embodiment of the present invention;

DETAILED DESCRIPTION

The present invention provides systems for structurally supporting end-fire antennas of a vehicular radar system. The system includes relatively rigid low-frequency printed circuit boards (PCBs) stacked between or sandwiched between relatively flexible high-frequency PCBs. The system also includes multiple end-fire antennas positioned on each of the high frequency PCBs and a radio frequency integrated circuit (RFIC) positioned on each of the high-frequency PCBs. The high-frequency PCBs are designed to reduce interference of signals of the end-fire antennas and the RFIC. In order to reduce the interference, the high-frequency PCBs may be relatively thin and/or made from a relatively malleable material. Because the low-frequency PCBs do not transmit signals having radar frequencies, they may be designed to have a greater rigidity than the high-frequency PCBs. Thus, by stacking or sandwiching the low-frequency PCBs between the high-frequency PCBs, the low-frequency PCBs provide support for the relatively flexible high-frequency PCBs.

The PCBs of the vehicular radar system are stacked in such a way that the transmission ends of the high-frequency PCBs (where the signals are transmitted by the end fire antennas) are separated from the low-frequency PCBs. Due to the malleability of the high-frequency PCBs, the transmission ends of the high-frequency PCBs can be reshaped in such a way that the end-fire antennas transmit signals in a desired direction.

The systems described herein provide several benefits and advantages such as providing structural support for relatively flexible high-frequency PCBs that contain end-fire antennas and RFICs. This advantageously reduces the likelihood of damage to the high-frequency PCBs. Use of relatively rigid low-frequency PCBs to support the high frequency PCBs is advantageously less expensive and more compact than alternative support options such as housings designed to separately support each of the high frequency-PCBs. The separation of the transmission end of the high-frequency PCBs from the low-frequency PCBs advantageously allows the transmission ends of the high-frequency PCBs to be oriented in a desirable direction. This provides the benefit and advantage of allowing signals from the end-fire antennas to be transmitted in a desired direction, advantageously increasing an area that can be scanned by the vehicular radar system at any given time.

Figure 1:
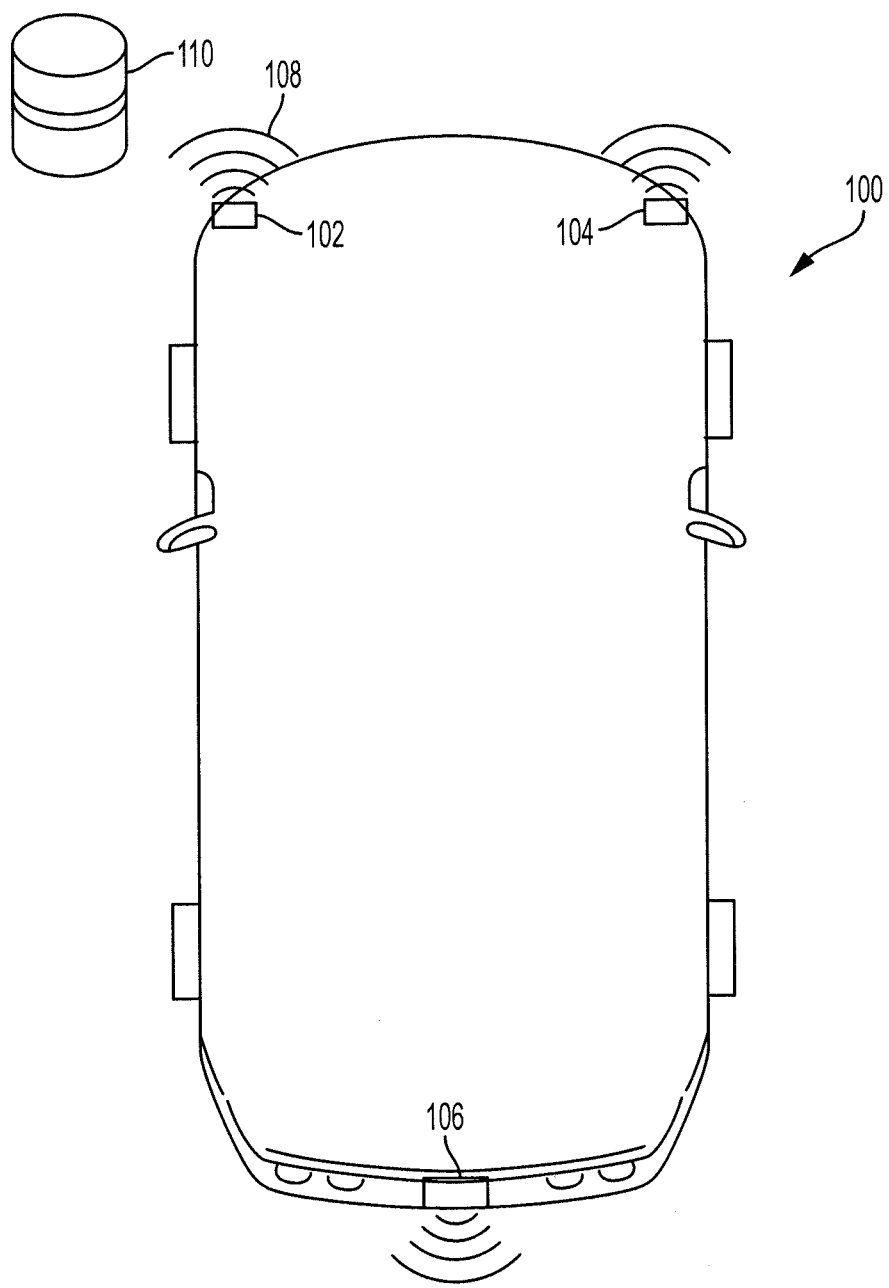
FIG. 1 is a drawing of a vehicle having multiple vehicular radar systems for sensing objects in an environment of the vehicle according to an embodiment of the present invention.

Turning to FIG. 1, a vehicle 100 having radar sensing capabilities is shown. The vehicle 100 includes a first vehicular radar system 102, a second vehicular radar system 104, and a third vehicular radar system 106. Each of the vehicular radar systems 102, 104, 106 may determine the location and characteristics of objects around the vehicle 100. For example, the vehicular radar system 102 may transmit a signal or a beam 108. The beam 108 may reflect off of an object 110 and propagate back towards the vehicular radar system 102. The vehicular radar system 102 may receive the reflected signal and determine a location and characteristics of the object 110 based on the received reflected signal.

Turning to FIGS. 2A, 2B, and 2C, a top view, a bottom view, and a side view, respectively, of an end-fire antenna array 200 are shown. The end-fire antenna array 200 may be included in the vehicular radar system 102. An L-W-H axis is shown in various drawings to illustrate directions corresponding to a length, a width, and a height of the vehicular radar system 102. Although features are described with reference to the length, the width, and the height, one skilled in the art will realize that the vehicular radar system 102 may be oriented in any direction such that, for example, a height may be referred to as a length and so forth.

The end-fire antenna array 200 has a plurality of end-fire antennas including a first end-fire antenna 202 and a second end-fire antenna 204. In some embodiments, the antenna array 200 may include between 2 and 32 end-fire antennas.

The antenna array 200, and thus the first antenna 202 and the second antenna 204, has a top 206 and a bottom 208. The tell is top and bottom are used for reference only. One skilled in the art will realize that the top 206 and the bottom 208 of the antenna array 200 may be oriented in any direction.

The first antenna 202 may include a metal 216 inside of or on a PCB 214. The metal 216 may be, for example, a metal trace printed on the PCB 214. The PCB 214 includes a transmission end 210 and a chip connection end 212. The transmission end 210 is an end of the PCB 214 from which signals propagate into the atmosphere from the antenna array 200. The chip connection end 212 of the PCB 214 is an end of the PCB 214 from which a signal propagates from an RFIC towards the first antenna 202.

A signal from a controller, such as an RFIC designed to transmit signals in a radio frequency, may be received by the first antenna 202 at the chip connection end 212. The signal may propagate through the first antenna 202 towards the transmission end 210. From the transmission end, the signal may be wirelessly transmitted into the atmosphere in the longitudinal direction (i.e., in the negative L direction).

Similarly, a wireless signal (such as a signal reflected off of an object) may be received by the first antenna 202 at the transmission end 210 and may propagate through the first antenna 202 to the chip connection end 212. The signal may then be received by the controller and analyzed by the controller to determine features of the object from which it was reflected.

The metal 216 of the first antenna 202 may include tin, gold, nickel, any other conductive metal, or any combination thereof. The metal 216 on the bottom 208 of the first antenna 202 may form a ground structure 218. The ground structure 218 may be electrically isolated from the metal 216 on the top 206 of the first antenna 202 and may be connected to an electrical ground.

The metal 216 on the top 206 of the first antenna 202 may form an antenna structure including a chip connection lead 219, a balun 220, a tapered section 222, and a wave section 224. In some embodiments, the metal 216 on the top 206 of the first antenna 202 may also form one or more beam adjustment feature 232 including a first beam adjustment feature 234 and a second beam adjustment feature 236. The first antenna 202 and the second antenna 204 may each be referred to as tapered slot end-fire antennas.

The chip connection lead 219 may be electronically connected to a controller, such as an RFIC, that controls operation of the antenna array 200.

The balun 220 may function as a transformer and convert an unbalanced signal to a balanced signal and/or may convert a balanced signal to an unbalanced signal.

The tapered section 222 is tapered from the wave section 224 to the balun 220. The converted signal may propagate through the tapered section 222 towards the wave section 224.

The wave section 224 may include a first wave section 226 and a second wave section 228 separated by a space 230. The design of the wave section 224 allows the signal propagating towards the transmission end 210 to continue to propagate beyond the wave section 224 in a wireless manner.

The beam adjustment features 232 may be included or adjusted to alter characteristics of a signal transmitted by the first antenna 202. The beam adjustment features 232 may be positioned within the space 230. The beam adjustment features 232 may have any shape such as the square shape that is shown, a triangular shape, a parallelogram shape, or the like. The beam adjustment features 232 may be electrically isolated from the other metal 216 on the top 206 of the first antenna 202 or may be in electrical contact with the other metal 216.

Figure 2D:
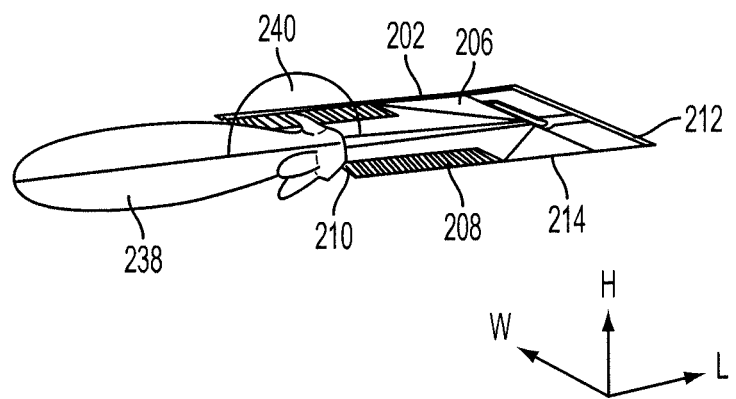
FIG. 2D is a drawing illustrating a shape of a radar beam transmitted by one of the end-fire antennas of FIG. 2A according to an embodiment of the present invention.

Turning to FIG. 2D, the first antenna 202 functions as an end-fire antenna because it transmits a signal or a beam 238 that propagates in a direction parallel to a longitudinal direction of the first antenna 202 (i.e., in the negative L direction). This is distinguished from a signal transmitted by a broadside antenna that propagates perpendicular to a longitudinal direction of an antenna (i.e., in the positive H direction).

Referring to FIGS. 2A and 2D, the beam adjustment features 232 may be varied to adjust characteristics of the beam 238. For example, a quantity of the beam adjustment features 232, a shape of the beam adjustment features 232, and/or dimensions of the beam adjustment features 232 may be selected to achieve desirable characteristics of the beam 238. In some embodiments, the quantity, the shape, and/or the dimensions of the beam adjustment features 232 may be selected in order for the beam 238 to form a desired angle 240 with the top 206 or the bottom 208 of the PCB 214.

Returning reference to FIGS. 2A, 2B, and 2C, bandwidths for automotive radar systems may be about 80 gigahertz (GHz), such as between 77 GHz and 79 GHz. Where used in this context, "about" refers to the referenced value plus or minus seven percent (7%). The end-fire antennas, including tapered slot end-fire antennas, provide desirable characteristics at these bandwidths. The end-fire antennas may be positioned adjacent to each other, as shown in FIG. 2A, in order to form a beam that scans in two dimensions. Furthermore, because the signal propagates away from the antenna in the longitudinal direction, the end-fire antennas may be stacked on top of each other, allowing for a volumetric (three-dimensional) scan.

In order to obtain desirable antenna properties of signals having bandwidths in the automotive spectrum, the substrate of the antenna array 200 (i.e., the PCB 214) may be relatively thin. For example, the first antenna 202 (including the PCB 214) may have a height of 0.127 mm in the H direction, a width of 2.5 mm in the W direction, and a length of 10 mm to 30 mm in the L direction.

Figure 3:
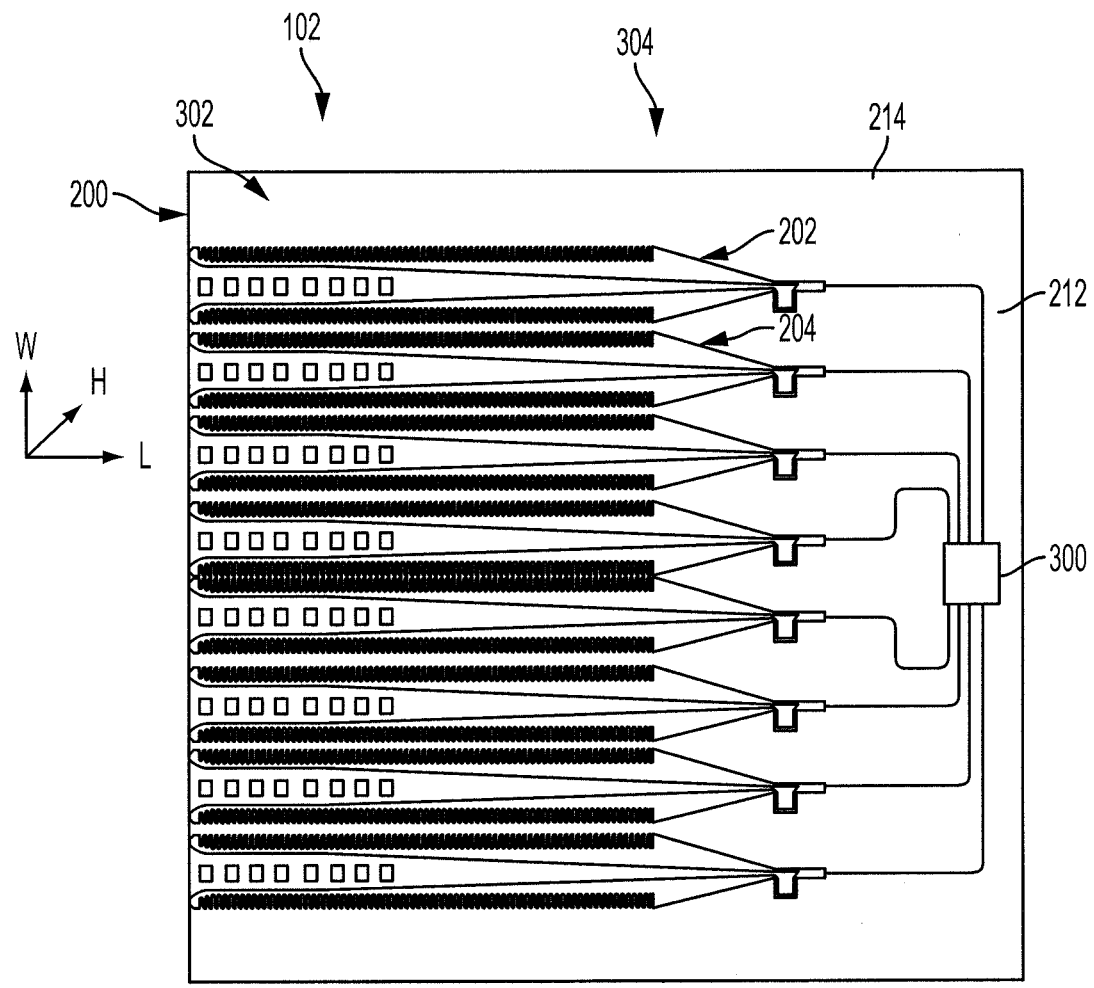
FIG. 3 is a drawing illustrating a two-dimensional radar board having the end-fire antenna array of FIG. 2A and a radio frequency integrated circuit (RFIC) coupled to the end-fire antenna array according to an embodiment of the present invention.

Turning now to FIG. 3, the vehicular radar system 102 may include a two-dimensional radar board 304. The two-dimensional radar board 304 may include the end-fire antenna array 200 that includes a plurality of end-fire antennas 302. The two-dimensional radar board 304 may also include an RFIC 300. The RFIC 300 may be connected to each of the plurality of end-fire antennas 302 of the end-fire antenna array 200. The RFIC 300 may be connected to the PCB 214, and thus the plurality of end-fire antennas 302, in any of a variety of manners such as flipchip bonding, wire bonding, or the like.

The RFIC 300 may control operation of each of the plurality of end-fire antennas 302. For example, the RFIC 300 may transmit a signal to each antenna of the plurality of end-fire antennas 302, which in turn may be wirelessly transmitted by the corresponding antenna.

The RFIC 300 may control the plurality of end-fire antennas 302 to transmit one or more radar beams. For example, at least some of the signals transmitted by the RFIC 300 to each of the plurality of end-fire antennas 302 may have a different phase. When the signals have a different phase and are transmitted into the atmosphere, the combined signals form a radar beam.

When the beam reaches an object away from the two-dimensional radar board 304, the beam may reflect from the object and travel towards the two-dimensional radar board 304. The reflected beam may be received by the end-fire antennas 302 and/or other end-fire antennas and may be transmitted from the antennas to the RFIC 300. The RFIC 300 may analyze the received beam that was reflected from the object and determine characteristics of the object based on the reflected beam.

Because the antennas 302 of the two-dimensional radar board 304 are positioned in a linear manner with respect to each other, the two-dimensional radar board 304 may scan in two dimensions. When two or more two-dimensional radar boards are stacked such that antennas are positioned in two directions with respect to each other, the radar boards may together scan in three dimensions.

Figure 4:
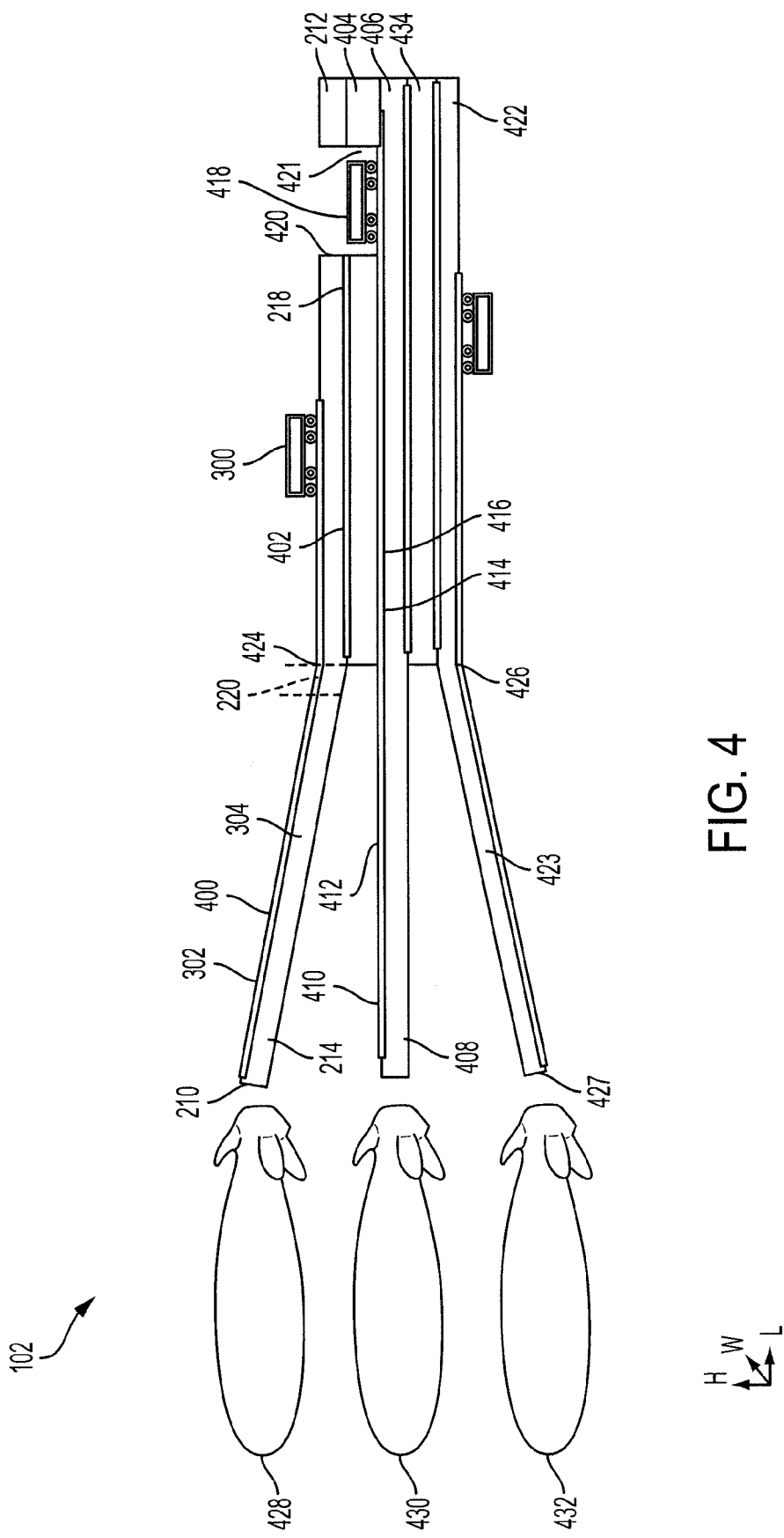
FIG. 4 is a drawing illustrating a cross-section of a vehicular radar system including multiple two-dimensional radar boards and multiple relatively rigid low-frequency printed circuit boards stacked between the two-dimensional radar boards according to an embodiment of the present invention.

Turning to FIG. 4, additional features of the vehicular radar system 102 are shown. As described above, the vehicular radar system 102 includes the two-dimensional radar board 304 that has the PCB 214, the plurality of end-fire antennas 302, and the RFIC 300. Metal traces 400 are positioned on a top of the PCB 214 and form the plurality of end-fire antennas 302 as well as connections between the end-fire antennas 302 and the RFIC 300. Metal traces 402 are positioned on a bottom of the PCB 214 and may form the ground structure 218 of the plurality of end-fire antennas 302.

As described above, the vehicular radar system 102 may transmit and receive signals having frequencies of about 80 GHz. Some printed circuit boards may have characteristics that interfere with signals having these relatively high frequencies. Thus, the PCB 214 must be made in such a way as to accommodate these relatively high frequency signals.

In order to reduce interference with signals from the plurality of end-fire antennas 302, the PCB 214 may include any high frequency material compatible with millimeter wave signals, such as RO3003. In order to further reduce interference with the signals, the PCB 214 may be relatively thin. In that regard, the PCB 214 may have a height in the H direction of between 0.01 mm and 1 mm, between 0.05 mm and 0.5 mm, between 0.05 mm and 0.3 mm, or about 0.127 mm. The use of such materials in combination with the relatively small thickness of the PCB 214 may cause the PCB 214 to be relatively flexible or malleable, to have a relatively low rigidity, and to bend with relative ease.

It is undesirable for the PCB 214 of the two-dimensional radar board 304 to break or change shape during use. Thus, it is desirable to support at least a portion of the PCB 214 when the vehicular radar system 102 is assembled. A second PCB 404 may be coupled to the PCB 214 in order to support the PCB 214. In particular, the second PCB 404 may be coupled to a bottom of the PCB 214 of the two-dimensional radar board 304. For example, the second PCB 404 may be coupled to the PCB 214 via an adhesive, such as a hot melt adhesive, screws, rivets, solder, or the like. In some embodiments, the second PCB 404 may be coupled to the metal traces 402 on the bottom of the PCB 214, may be coupled to a non-metallic surface on the bottom of the PCB 214, or a combination of both.

In some embodiments, high-frequency signals from the plurality of end-fire antennas 302 and/or the RFIC 300 may not propagate along or through the second PCB 404. In that regard, it is not necessary for the second PCB 404 to be capable of handling signals having frequencies near 80 GHz. Accordingly, the second PCB 404 may include different materials than the PCB 214 and may have a greater thickness than the first PCB 214, allowing the second PCB 404 to be designed to have a greater rigidity than the first PCB 214. For example, the material of the second PCB 404 may be selected to have a relatively high strength to provide structural support to the first PCB 214, such as FR4. Likewise, the second PCB 404 may have a thickness in the H direction of between 0.01 mm and 5 mm, between 0.1 mm and 3 mm, between 0.1 mm and 1 mm, or the like.

In some embodiments, the second PCB 404 may be made of a material or combination of materials that has a greater rigidity than a material of the first PCB 214 of the two-dimensional radar board 304. In some embodiments, the second PCB 404 may be made of a similar material as the first PCB 214 and may have a greater thickness than the first PCB 214.

It is undesirable for the second PCB 404 to interfere with the signals transmitted by the plurality of end-fire antennas 302. In order to reduce the likelihood of interference with the signals, the second PCB 404 may extend from the chip connection end 212 of the PCB 214 to a location between the chip connection end 212 and the transmission end 210. In some embodiments, the second PCB 404 may extend from the chip connection end 212 to a location aligned with the balun 220 of the plurality of end-fire antennas 302 along the L direction. For example, the second PCB 404 may extend to a center of the balun 220, an end of the balun 220 nearest the transmission end 210, or an end of the balun 220 nearest the chip connection end 212.

As described above, the two-dimensional radar board 304 can provide a two-dimensional scan of the environment. Multiple two-dimensional radar boards may be aligned with each other along the H direction in order to provide a volumetric scan of the environment. Thus, the vehicular radar system 102 includes multiple two-dimensional radar boards for detecting three-dimensional data regarding the environment.

In order to include multiple two-dimensional radar boards to the vehicular radar system 102, a PCB having a higher rigidity than those of the two-dimensional radar boards may be stacked between, and coupled to, a pair of two-dimensional radar boards. For example, the second PCB 404 may be stacked between the first two-dimensional radar board 304 and a second two-dimensional radar board 406. The PCB 404 may be coupled to a top of the second two-dimensional radar board 406 in a similar manner as it is coupled to the first two-dimensional radar board 304. Similarly, another relatively rigid low-frequency PCB 434 may be coupled to a bottom of the second two-dimensional radar board 406 and a top of a third two-dimensional radar board 422.

Each of the two-dimensional radar boards 406, 422 may include similar features as the two-dimensional radar board 304. For example, the second two-dimensional radar board 406 includes a PCB 408, metal traces 410 on a top of the PCB 408, metal traces 414 on a bottom of the PCB 408, and an RFIC 418. The metal traces 410 form a plurality of end-fire antennas 412 and connections between the end-fire antennas 412 and the RFIC 418. The metal traces 414 may form ground structures 416 of the plurality of end-fire antennas 412.

As shown, the RFIC 418 extends in the H direction from the PCB 408 of the second two-dimensional radar board 406. In order to accommodate the RFIC 418 of the second two-dimensional radar board 406, the PCB 214 of the first two-dimensional radar board 304 and the PCB 404 may each be designed to have a chip aperture. For example, the PCB 214 of the first two-dimensional radar board 304 includes a chip aperture 420 and the PCB 404 between the first two-dimensional radar board 304 and the second two-dimensional radar board 406 includes a chip aperture 421. The chip apertures 420, 421 provide a volume for receiving the RFIC 418 when the vehicular radar system 102 is assembled. In some embodiments, a vehicular radar system may include more than three two-dimensional radar boards such that PCBs at the outer end of the vehicular radar system include multiple chip apertures for receiving RFICs of multiple two-dimensional radar boards.

In some embodiments, it may be desirable for power or other relatively low frequency signals to be transmitted from one two-dimensional radar board to another two-dimensional radar board. For example, it may be desirable for a power signal to be transferred between the first two-dimensional radar board 304 and the second two-dimensional radar board 406. Such low frequency signals can pass through the more rigid PCBs, such as the PCB 404, with relatively low interference due to the low frequency of the signals as compared to the high frequency radar signals. Thus, in some embodiments, vias or through holes may exist in the low-frequency PCBs 404, 434 for allowing low-frequency signals to be transferred between adjacent two-dimensional radar boards. For example, a power signal may transfer from the first two-dimensional radar board 304 to the second two-dimensional radar board 406 via a through hole or via (not shown) through the PCB 404.

Because the PCBs of the two-dimensional radar boards 304, 406, 422 are relatively flexible, they may be formed to have a desired shape. For example, as shown in FIG. 4, the PCB 214 of the first two-dimensional radar board 304 is bent at a location 424. The PCB 214 is bent in such a way as to orient the transmission end 210 of the PCB 214 in a direction away from the PCB 408 of the second two-dimensional radar board 406. By bending the PCB 214 in this manner, a radar beam 428 from the plurality of end-fire antennas 302 of the first two-dimensional radar board 304 may be oriented in a direction away from the second two-dimensional radar board 406. Similarly, a PCB 423 of the third two-dimensional radar board 422 may be bent at a location 426 such that a transmission end 427 of the PCB 423 is oriented away from the second two-dimensional radar board 406. This bending orients a radar beam 432 from the third two-dimensional radar board 422 in a direction away from the second two-dimensional radar board 406.

By bending the PCB 214 and the PCB 423 to orient the radar beam 428 and the radar beam 432 away from the second two-dimensional radar board 406, the radar beam 428 from the first two-dimensional radar board 304, the radar beam 432 from the third two-dimensional radar board 422, and a radar beam 430 from the second two-dimensional radar board 406 may scan a greater volume at any given time.

Figure 5:
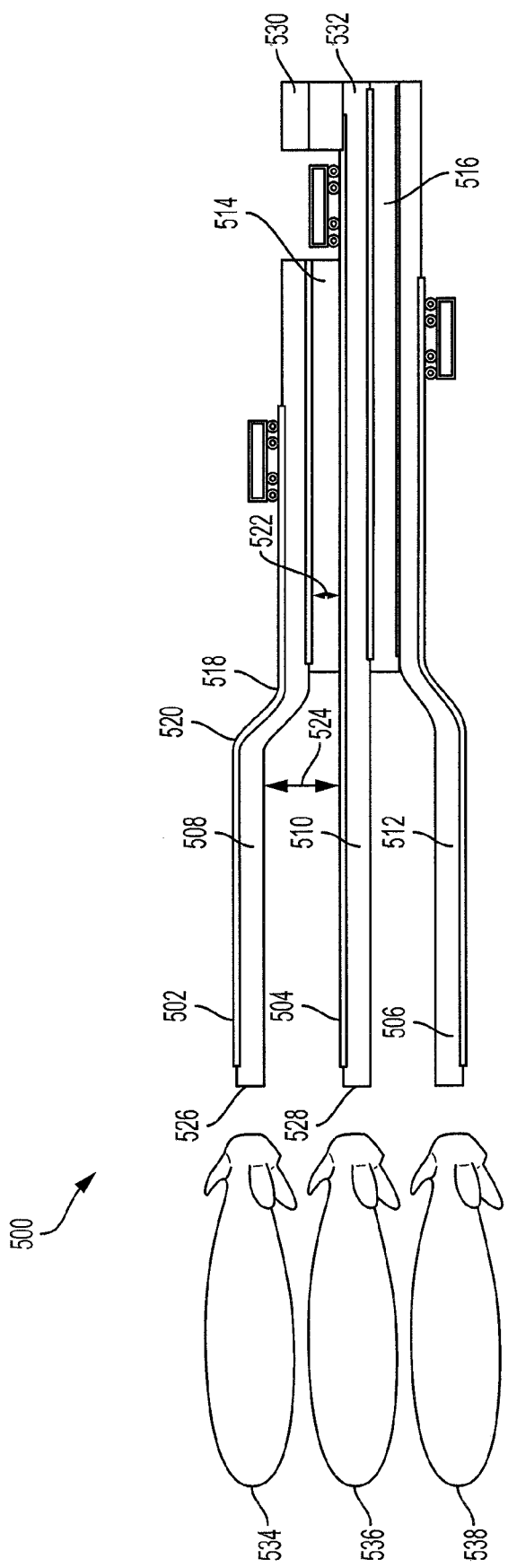
FIG. 5 is a drawing illustrating a cross-section of another vehicular radar system including multiple two-dimensional radar boards and multiple relatively rigid low-frequency printed circuit boards stacked between the two-dimensional radar boards according to an embodiment of the present invention.

Turning now to FIG. 5, another vehicular radar system 500 includes a first two-dimensional radar board 502, a second two-dimensional radar board 504, and a third two-dimensional radar board 506. Each of the two-dimensional radar boards 502, 504, 506 may include similar features as the two-dimensional radar board 304 of FIG. 4. The first two-dimensional radar board 502 includes a relatively high-frequency PCB 508, the second two-dimensional radar board 504 includes a relatively high-frequency PCB 510, and the third two-dimensional radar board 506 includes a relatively high-frequency PCB 512.

The vehicular radar system 500 also includes a first relatively rigid low-frequency PCB 514 and a second relatively rigid low-frequency PCB 516. The first relatively rigid PCB 514 is stacked between, and coupled to, the PCB 508 and the PCB 510. The second relatively rigid PCB 516 is stacked between, and coupled to, the PCB 510 and the PCB 512. In that regard, the vehicular radar system 500 is similar to the vehicular radar system 102 of FIG. 4.

Unlike the vehicular radar system 102 of FIG. 4, the PCB 508 of the first two-dimensional radar board 502 and the PCB 512 of the third two-dimensional radar board 506 are each bent at two locations instead of one. For example, the PCB 508 is bent at a first location 518 away from the second two-dimensional radar board 504. The PCB 508 is bent again at a second location 520 to cause a transmission end 526 of the PCB 508 to become parallel to a transmission end 528 of the PCB 510.

The effect of bending the PCB 508 in two locations increases a distance between the first two-dimensional radar board 502 and the second two-dimensional radar board 504 at the transmission ends 526, 528. For example, a distance 522 between the first two-dimensional radar board 502 and the second two-dimensional radar board 504 near the chip connection ends 530, 532 of the PCBs 508, 510 is less than a distance 524 between the first two-dimensional radar board 502 and the second two-dimensional radar board 504 near the transmission ends 526, 528.

Because the PCBs 508, 512 are bent to increase separation from the second two-dimensional radar board 504, radar beams 534, 536, 538 from the two-dimensional radar boards 502, 504, 506 have a greater separation and may scan a larger volume at any given time than without the increased separation.

Figure 6:
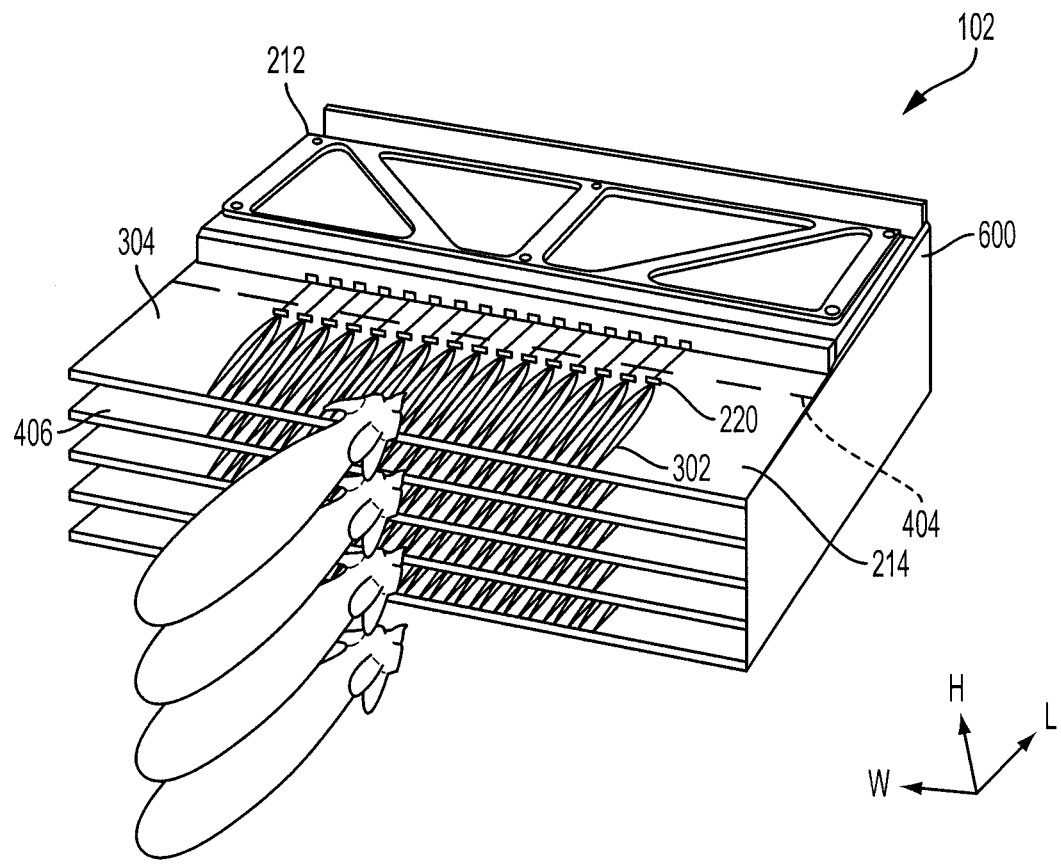
FIG. 6 is a drawing illustrating the vehicular radar system of FIG. 4 positioned within a housing according to an embodiment of the present invention.

Turning now to FIG. 6, a housing 600 may be provided for the vehicular radar system 102. The housing 600 may include any rigid or semi rigid material such as metal, plastic, or the like. The housing 600 may be used to retain each of the two-dimensional radar boards in a desired location and to protect components of each of the two-dimensional radar boards.

As shown, the housing 600 may at least partially enclose each of the two-dimensional radar boards including the first two-dimensional radar board 304 and the second two-dimensional radar board 406. The housing 600 may also at least partially enclose each of the relatively rigid PCBs including the PCB 404.

As with the relatively rigid low-frequency PCB 404, the housing 600 may be designed in such a way as to reduce the likelihood of interference with the signals from the various antennas. For example, when the housing 600 is installed, the plurality of end-fire antennas of each of the two-dimensional radar boards may be exposed. In that regard, the housing 600 may be positioned towards the chip connection end 212 of the PCB 214 from the balun 220 of the plurality of end-fire antennas 302.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicular radar system comprising:
   a first printed circuit board (PCB) having a first material;
   a plurality of end-fire antennas positioned on the first PCB;
   a second PCB stacked on or under the first PCB and having a second material that has a greater rigidity than the first material; and
   a radio frequency integrated circuit (RFIC) coupled to the plurality of end-fire antennas and configured to control the plurality of end-fire antennas.

2. The vehicular radar system of claim 1 wherein the first PCB has a chip connection end and a transmission end and wherein the second PCB is stacked on or under the first PCB between the chip connection end and a line parallel to and positioned between the chip connection end and the transmission end such that the transmission end of the first PCB is separated from the second PCB.

3. The vehicular radar system of claim 2 wherein the first PCB has a top and a bottom and each of the plurality of end-fire antennas includes:
   a ground structure positioned adjacent to the chip connection end of the first PCB on the bottom of the first PCB;
   a chip connection lead positioned adjacent to the chip connection end of the first PCB and electrically coupled to the RFIC;
   a balun positioned adjacent to the chip connection lead and configured to convert an unbalanced signal to a balanced signal or to convert a balanced signal to an unbalanced signal;
   a wave section having a first wave section and a second wave section separated by a space and configured to transmit a wireless radar signal; and
   a tapered section positioned between the balun and the wave section and tapered towards the balun from the wave section.

4. The vehicular radar system of claim 3 wherein the second PCB is coupled to the top or the bottom of the first PCB and positioned between the balun of each of the plurality of end-fire antennas and the chip connection end of the first PCB.

5. The vehicular radar system of claim 2 wherein the first material is malleable and a portion of the first PCB between the transmission end and the line is bent to orient the transmission end of the first PCB in a desired direction.

6. The vehicular radar system of claim 2 further comprising a housing at least partially enclosing the second PCB and a portion of the first PCB between the transmission end and the line.

7. The vehicular radar system of claim 1 wherein the first material includes RO3003 and the second material includes FR4.

8. The vehicular radar system of claim 1 wherein:
the first PCB has a top;
the RFIC is connected to the top of the first PCB; and
the second PCB is positioned on the top of the first PCB and defines a chip aperture for receiving the RFIC.

9. A vehicular radar system comprising:
a first radar board having:
a first printed circuit board (PCB) made of a first material and having a chip connection end and a transmission end, and
a first plurality of end-fire antennas;
a second radar board having:
a second PCB made of the first material and having a chip connection end and a transmission end, and
a second plurality of end-fire antennas;
a third PCB stacked between the first PCB and the second PCB and made of a second material that has a greater rigidity than the first material; and
at least one radio frequency integrated circuit (RFIC) coupled to the first plurality of end-fire antennas and the second plurality of end-fire antennas and configured to control each of the first plurality of end-fire antennas and each of the second plurality of end-fire antennas.

10. The vehicular radar system of claim 9 wherein the third PCB is stacked between the first PCB and the second PCB between the chip connection end and a line parallel to and positioned between the chip connection end and the transmission end such that the transmission end of the first PCB and the second PCB is separated from the third PCB.

11. The vehicular radar system of claim 10 wherein each of the first PCB and the second PCB has a top and a bottom and each of the first plurality of antennas and the second plurality of antennas includes:
a ground structure positioned adjacent to the chip connection end of the first PCB or the second PCB on the bottom of the first PCB or the second PCB;
a chip connection lead positioned adjacent to the chip connection end of the first PCB or the second PCB and electrically coupled to the RFIC;
a balun positioned adjacent to the chip connection lead and configured to convert an unbalanced signal to a balanced signal or to convert a balanced signal to an unbalanced signal;
a wave section having a first wave section and a second wave section separated by a space and configured to transmit a wireless radar signal; and
a tapered section positioned between the balun and the wave section and tapered towards the balun from the wave section.

12. The vehicular radar system of claim 11 wherein the third PCB is coupled to the bottom of the first PCB and the top of the second PCB and positioned between the balun of each of the first plurality of end-fire antennas and the second plurality of antennas and the chip connection end of the first PCB and the second PCB.

13. The vehicular radar system of claim 10 wherein the first material is malleable and a portion of the first PCB between the transmission end and the line is bent to orient the transmission end of the first PCB in a direction away from the second PCB.

14. The vehicular radar system of claim 10 wherein the first material is malleable and the first PCB is bent at a first location between the transmission end and the line to separate the first PCB from the second PCB and is bent at a second location between the transmission end and the first location to cause the transmission end of the first PCB to be parallel to the transmission end of the first PCB.

15. The vehicular radar system of claim 9 wherein:
the second PCB has a top;
one of the at least one RFIC is connected to the top of the second PCB;
the third PCB has a bottom coupled to the top of the second PCB and a top and defines a chip aperture for receiving the RFIC; and
the first PCB has a bottom coupled to the top of the third PCB and defines another chip aperture for receiving the RFIC.

16. A vehicular radar system comprising:
a first printed circuit board (PCB) having a chip connection end, a transmission end, a top, and a bottom;
a plurality of end-fire antennas positioned on the first PCB each having:
a ground structure positioned adjacent to the chip connection end of the first PCB on the bottom of the first PCB,
a chip connection lead positioned adjacent to the chip connection end of the first PCB and electrically coupled to the RFIC,
a balun positioned adjacent to the chip connection lead and configured to convert an unbalanced signal to a balanced signal or to convert a balanced signal to an unbalanced signal,
a wave section having a first wave section and a second wave section separated by a space and configured to transmit a wireless radar signal, and
a tapered section positioned between the balun and the wave section and tapered towards the balun from the wave section;
a second PCB coupled to the top or the bottom of the first PCB, having a greater rigidity than the first PCB, and positioned between the balun of each of the plurality of end-fire antennas and the chip connection end of the first PCB; and
a radio frequency integrated circuit (RFIC) coupled to the plurality of end-fire antennas and configured to control the plurality of end-fire antennas.

17. The vehicular radar system of claim 16 wherein the first PCB has a first material and the second PCB has a second material that has a greater rigidity than the first material.

18. The vehicular radar system of claim 16 further comprising a housing at least partially enclosing the second PCB and a portion of the first PCB between the balun of each of the plurality of end-fire antennas and the chip connection end of the first PCB.

19. The vehicular radar system of claim 16 wherein the first PCB is malleable and a portion of the first PCB between the transmission end and the balun is bent to orient the transmission end of the first PCB in a desired direction.

20. The vehicular radar system of claim 16 wherein:
the first PCB has a top;
the RFIC is connected to the top of the first PCB; and
the second PCB is positioned on the top of the first PCB and defines a chip aperture for receiving the RFIC.

* * * * *